Patented May 3, 1938

2,115,717

UNITED STATES PATENT OFFICE 2,115,717

MANUFACTURE OF PROLAMINE COMPOSITION

Donald W. Hansen, Decatur, Ill., assignor, by mesne assignments, to Prolamine Products Incorporated, Dover, Del., a corporation of Delaware No Drawing. Application November 10, 1934, Serial No. 752,537

9 Claims. (Cl. 160—38)

The present invention relates to a composition having a prolamine as a base, and may be useful in the formation of coatings, and a variety of forms. It has particular reference to the formation of a transparent flexible plasticized composition for plastics, films, filaments, coatings and the like.

The invention employs as a base material a particular type of protein known as the prolamines. The prolamines are known as the alcohol soluble proteins. When prepared by alcoholic extractions and by driving off the solvent, the residual prolamine is a hard horny mass. In general the prolamines are characterized by insolubility in water, in absolute alcohol and in other neutral solvents, but are soluble in relatively strong aqueous alcohols of, for example, 70% to 80% alcohol. The common prolamines are obtained from seeds of the cereal grains, and are designated zein from corn, gliadin from wheat, and hordein from barley. This general source and classification of prolamines is not exclusive, for it is known that there are other so-called prolamines, such as an alcohol-soluble protein found in milk, which however has chemical characteristics somewhat different. In referring herein to prolamines it is to be understood that prolamines from cereals are specifically intended, and such other alcohol-soluble proteins as have similar behavior.

The prolamines usually occur in grains in the gluten, and are extractable therefrom by an aqueous alcohol solvent. For example corn gluten may be extracted with a solvent mixture of 75% ethyl alcohol and 25% water, to remove the prolamine "zein". The methods of preparing and purifying zein and other prolamines are well known and form no essential part of the present invention. However, the said known processes may be modified so that they are conducted in a manner to provide a suitable alcoholic solution of prolamine as a starting material for practice of the present invention.

Ordinarily prolamines, such as zein, are prepared in a solvent mixture of ethyl alcohol and water. One of the difficulties in making solid prolamine compositions is the use of a suitable solvent to maintain in solution the prolamine, any plasticizer or such other ingredients as may be added to modify the properties of the prolamine alone. The solvent includes water as well as other volatile material, and as both evaporate, the residual solvent must be such as to maintain the non-volatile substance in a soluble or equivalent dispersed form, and to prevent precipitation of the prolamine or other ingredient. Such precipitation prevents the formation of transparent material, and it so alters the composition that the precipitated material is apart from and cannot function to give properties to a homogeneous matrix. When prolamine or other ingredient precipitates in a composition, it is more like an inert filler. In other words the residual matter from evaporation of volatile solvent must be a gel.

The precipitation of prolamine is common in evaporating a solution of prolamine in which the solvent is a mixture of ethyl alcohol and water, or other mixture of water and a rather highly volatile component, such as the low-boiling alcohols used in extracting zein from sources of supply. The evaporation of the highly volatile component leaves a mixture too high in water-content to be a proper solvent.

The present invention is based upon the discovery that by properly compounding an aqueous solvent for prolamine, the rates of evaporation of the components may be so controlled that the residual solvent is a suitable solvent mixture which avoids precipitation of prolamine or other substance in the composition.

It is an object of the invention to employ a mixed solvent for prolamine which contains a component capable of leveling or balancing the rates of evaporation of the more volatile components including water, so that prolamine, and any other dissolved ingredients, are not precipitated, whereby a clear matrix composition is obtained which is homogeneous with respect to the non-volatile solutes in the original mixture subjected to evaporation.

It is also an object of the present invention to employ a mixed solvent for a prolamine which contains a high-boiling non-aqueous component or in other words, a slowly volatile component.

It is also an object of the invention to employ a mixed solvent of the above kind which acts similarly upon a plasticized prolamine, that is, which maintains at all times in solution, and in the final form, a homogeneous plasticized prolamine base.

Various other and ancillary objects and advantages of the invention will become apparent from the following description and explanation of the invention as set forth in the following description and explanation.

Preparation of prolamine

The prolamine may be prepared from gluten by extraction with a suitable solvent, preferably an aqueous alcohol. Ethyl alcohol 70% and water 30% has been recommended as the preferred and practical solvent, but higher alcohols and different strengths may be used. For certain purposes I prefer to use 80% to 85% ethyl alcohol, remainder being water. The preferred solvent is used for zein until it contains about 10% zein and 90% solvent. Part of the solvent may then be evaporated to concentrate the prolamine. For zein, the concentration is usually increased to 12% to 20% zein in the aqueous alcohol solution. In many instances a standard composition has been employed which is referred to hereinafter as the "standard base solution" and it is substantially as follows:

| | Per cent by weight |
|---|---|
| Zein | 12 |
| Ethyl alcohol 80%<br>Water  20% | 88 |

In preparing the prolamine from gluten, certain purification processes may be practiced. The various gluten sources of the prolamines are treated in substantially the same way, as illustrated by the process for zein.

As ordinarily prepared a zein solution, obtained by an aqueous alcoholic extraction of gluten, is highly colored due to coloring agents, possibly carotene or xanthophyll, or both, which occur in the corn gluten. By preliminarily extracting dry gluten with 95% ethyl alcohol, such coloring agents may be sufficiently removed so that upon a subsequent extraction with an 80% to 85% ethyl alcohol (remainder is water) a much less colored solution of zein is obtained. This may be practically completely decolorized by warming with about 2% of high grade decolorizing carbon, based on the quantity of solution. The extraction may be conducted until there is 10% of zein in the solution. This may be concentrated to a higher content, such as from 12% to 20%. In general practice I have used a 12% solution.

*Balancing solvents*

The standard base solution which is used, having ethyl alcohol and water as the solvent mixture, is inadequate as a solvent for evaporation to form a suitable composition or a commercial film. The alcohol evaporates more readily than the water and a stage may be readily reached where the residual solvent substance will be insufficient to keep the zein in solution. Precipitation of zein before drying of the film will thus make a translucent film.

I therefore alter such a solvent mixture for making films by evaporation to one which will maintain the zein, or other prolamine, in solution until the film is dry. This is preferably done by adding one or more different solvents. In practice, the added substance of course must be one which will be compatible with the plasticizer, when that is used, and with other material when such is used. There is wide choice of additional solvents that may be added. As a rule, they are solvents which are volatile ones having a higher boiling point than ethyl alcohol, and which are miscible to some extent with water. I have found that commercially, the most desirable added volatile solvent should have a boiling point not over about 135° C., and preferably lower, in order to give a fairly quick drying time in film formation. However, this does not signify that higher boiling solvents may not be used.

In order to test the utility of any specific material as an added solvent for zein for film formation, the following procedure has been adopted. To 10 parts by volume of standard zein base solution, 2 parts by volume of the solvent are added. The solution is poured on a glass surface to form a film and dried at about 60° C. Its effect can thus be ascertained. Various degrees of cloudiness may be found during the drying process, and at the end of the process. However, limited cloudiness in this test does not indicate unsuitability of a particular solvent, for the reason that in the presence of a plasticizer or other material, the cloudiness may not occur. In the absence of plasticizer and other material, the following solvents give no cloudiness in the final film and are highly useful.

| Solvent | Boiling point ° C. |
|---|---|
| Normal propyl alcohol | 97 |
| Ispropyl alcohol | 81 |
| Normal butyl alcohol | 117 |
| Isobutyl alcohol | 107 |
| Secondary butyl alcohol | 100 |
| Tertiary butyl alcohol | 83 |
| Normal butyl carbinol | 138 |
| Isobutyl carbinol | 131 |
| Secondary butyl carbinol | 128 |
| Diethyl carbinol | 117 |
| Dimethyl-ethyl-carbinol | 102 |
| Methyl-propyl-carbinol | 114 |
| Methyl isopropyl carbinol | 112 |
| Ethylene glycol monomethyl ether | 125 |
| Ethylene glycol monoethyl ether | 134 |
| Ethylene glycol monobutyl ether | 171 |
| Trimethylene glycol monoethyl ether | 160 |
| Propylene glycol monoethyl ether | --- |
| Ethylene glycol monobenzyl ether mm | 132/13 |
| b-b'-Dihydroxy ethyl ether do | 130/10 |
| b-Ethoxy b'-ethoxy ethyl ether do | 130/10 |
| Normal butyl a-hydroxy isobutyrate do | 65/5 |
| Ethylene glycol monoacetate do | 100/18 |
| b-Hydroxy ethyl formate do | 80/20 |
| Ethyl a-hydroxy isobutyrate | 144 |
| Diacetone alcohol | 166 |

Other solvents have been tried which give slight cloudiness in the film after complete drying. These include:

Dimethyl-normal-propyl carbinol
Heptyl alcohol
Ethyl lactate
Diacetin

It is to be understood that although I have divided the solvents into two classes by an arbitrary test, it does not signify that they constitute two types nor that these represent all the solvents. According to variations in the zein base solution, the presence of plasticizers, the presence of other agents, and different proportions of the solvent to the zein base, a particular solvent may lie in one class or another, as above given. In fact some of the solvents which are listed as giving final clear films, have shown cloudiness in the preliminary drying stages. The purpose of the classification here given is to show that many solvents are suitable, and that one must select a solvent which is proper for the particular composition at hand, and the result desired.

Furthermore, it is also to be understood that the last given list is not excluded from use in the invention, since other factors than those specified may alter the results. For example, other factors are, use of a base solution other than standard, use of a base other than zein, use of a more concentrated base solution, use of a different drying temperature, use of a different proportion of solvent to base solution, use of a different alcohol in the base solution, use of a plasticizer in the solution, and use of another agent in the solution.

For convenience of identification I refer to this additional solvent as a "balancing solvent" for the reason that its function is to level, control, or balance the rates of evaporation of water and volatile solvent so that the unevaporated residue remains as a satisfactory solvent mixture to carry out the purposes of the invention.

These balancing solvents also have other important effects on the formation of a film which are pertinent to the present invention. With some balancing solvents a dried film strips readily from glass, and with others it strips with difficulty from glass. Solid metal surfaces as well as glass surfaces are used for stripping, and the results with the two are not always comparable for a particular composition. The choice of solvent material may sometimes be dictated by the question of stripping from a particular surface.

Still another effect of the balancing solvent is in the surface presented by a film or coating. Some solvents in the test described yield a smooth surface, while others yield a rough or pebbly surface, herein and technically described as "orange peel". In the test described the following solvents give a smooth surface, which is the most desirable surface for most uses of a coating or film: normal propyl alcohol, isopropyl alcohol, normal butyl alcohol, tertiary butyl alcohol, ethylene glycol monomethyl ether, trimethylene glycol monoethyl ether, propylene glycol monoethyl ether, beta hydroxy ethyl formate, and ethyl alpha-hydroxy-isobutyrate.

In choosing a balancing solvent for commercial purposes I recommend an alcohol or glycol ether which is fairly soluble in water, such as a propyl or butyl alcohol. Many of the most satisfactory solvents which I have used boiled in the range 100° to 115° C. Ethylene glycol monomethyl ether and ethylene glycol monoethyl ether are also recommended. These are solvents boiling at over 120° C. and are very suitable even though they boil at over 115° C.

*Plasticizer*

Where a plasticizer is used it may be one of a varied list, and of course it is to be understood that one balancing solvent may be more suitable for one plasticizer while a different balancing solvent may be more suitable or even required for another plasticizer.

In the following examples plasticizers are present because they impart flexibility to the prolamine solid to be formed. Where such flexibility is not desired, the plasticizer may be omitted without altering the function of the balancing solvent. It is of course to be understood that when plasticizer is employed the same must be compatible with all the other ingredients, and must be a solute in the liquid composition both before and after the evaporation of the volatile ingredients. It is also to be understood that where an excessive amount is employed the excess may separated out leaving the remainder in solution to exercise the plasticizing function.

*Example 1*

A liquid-coating composition is made in a manner as described in my copending application Serial No. 558,840, filed August 22, 1931, now U. S. Patent No. 1,992,122, issued February 19, 1935, and as described in my copending application Serial No. 595,960, filed February 29, 1932, now U. S. Patent No. 2,074,332, issued March 23, 1937.

Powdered zein may be used in a mass comprising 20 parts of zein, a solvent comprising 45 parts denatured ethyl alcohol (for example Formula 30) 35 parts acetone, 10 parts water, about 10 parts of butyl acetate as a balancing solvent, and 1 part of dibutyl phthalate as a plasticizer. The butyl acetate is a neutral, colorless organic solvent boiling at 126.5° C. Dibutyl phthalate is a substantially non-volatile, neutral odorless plasticizer for zein and other prolamines, which renders a prolamine composition flexible.

The above described composition is capable of being cast or coated onto a smooth surface such as glass or a moving smooth metal belt, whereon it may be dried to yield a strippable transparent flexible film. It is also useful as a priming coat for surfaces which ordinarily repel or are poorly adherent to a glue or cement coating. The zein priming coat adheres readily to such surfaces, such as pyroxylin lacquered surfaces, or to artificial leather, and it also is adhered to well by the glue or cement which does not adhere to the pyroxylin coated surface or artificial leather. This is described in my earlier application Serial No. 558,840, filed August 22, 1931, now U. S. Patent No. 1,992,122, issued February 19, 1935.

*Example 2*

A liquid-coating composition is made using a solution containing 12% zein in a solvent consisting of 70% ethyl alcohol and 30% water. For every 100 parts of dry zein 15 parts of glycerol is added as a plasticizer. This is a substantially non-volatile, neutral, odorless organic substance. To this is added a protein-fixing agent, or tanning agent in the form of commercial 40% formalin solution to provide 10 parts of formaldehyde (normally a gas) to 100 parts of dry zein. As a balancing solvent there is added 15 parts of ethylene glycol monoethyl ether, cellosolve) per 100 parts of zein. The materials are then refluxed for a short time, such as one-half hour, to assure reaction between the formaldehyde and the zein.

The liquid product may be used as a coating for solid bodies, or it may be cast as a thin layer on a smooth surface, such as a glass plate, or a slowly moving belt to form a film. The temperature around the liquid layer to dry it may be 75° C. to hasten evaporation of the solvent ingredients until a film is formed. From the smooth surfaces a thin transparent film may be stripped. If desired such a film may be coated with a resin, such as a liquid containing an alcohol soluble phenol-formaldehyde type of resin, an equal amount of hexamethylene-tetramine, and an equal amount of resin plasticizer such as alpha chloronaphthalene. Such a resin coating dissolved in alcohol may be applied to the film and dried, then the coated film heated at 125° C. to react and harden the resin.

If desired the resin composition above described may be added to the zein solution which forms the zein film or coating and the said film or coating will be transparent, flexible and water-resistant in its body and surface. Such a coating composition is first dried at 75° C., and then either before or after stripping, it may be heated to 125° C. to harden the resin, as described in my prior application Serial No. 634,618, filed September 23, 1932, now U. S. Patent No. 2,047,961, issued July 21, 1936, of which the present application is a continuation in part. In such case there may be 5 parts of each of the components of the resin composition to each 100 parts of dry zein employed.

The balancing solvent, ethylene glycol monoethyl ether serves to control the evaporation of the water, alcohol and balancing solvent, so that the residual solvent at all times prevents precipitation of dissolved substance, with the result that a clear transparent homogeneous zein base product is obtained. The solvent is a slowly evaporating solvent which boils at over 120° C. As used it is a mutual organic solvent for the plasticizer, and is substantially colorless, and neutral. There are related solvents, all known as a "Cellosolve", such as:

Ethylene glycol monomethyl ether
Ethylene glycol monoethyl ether
Ethylene glycol monobutyl ether
Diethylene glycol monoethyl ether
Diethylene glycol monobutyl ether All these are suitable balancing solvents.

Example 3

A balancing solvent may be used which is not a neutral or a volatile one. Its function to produce a clear film, or to level, control, or balance the rate of evaporation is dependent upon its characteristics as a solvent rather than upon its volatility. Triethanolamine is an example of such a balancing solvent. It may be used in a plasticized prolamine composition. A 10% zein solution in a solvent having 90% ethyl alcohol and 10% water may be employed. This may be concentrated by boiling to bring the zein content to 20% of the final mass. To this mass 1 part of dibutyl phthalate to 20 parts of zein is added as plasticizer, and also 2 parts of triethanolamine. This assures that the product dries clear, and not cloudy, when the volatile ingredients are evaporated. Quick drying at elevated temperatures is permitted. This composition and variations thereof are more fully described in my application Serial No. 595,960, filed February 29, 1932, now U. S. Patent No. 2,074,332, issued March 23, 1937.

Example 4

To 75 parts by weight of a 12% zein solution in a solvent consisting of 70% ethyl alcohol and 30% water, or to any equivalent solution, I may add as a balancing solvent 10 parts by weight of ethylene glycol monoethyl ether. As a plasticizer I may add 2 parts by weight of dibutyl tartrate. In addition there is added protein fixative such as 2.5 parts by weight of 37% formaldehyde solution, or a small quantity of glyoxal.

The resulting mixture may be extruded as a film or filament, or coated onto a surface so that on drying the desired formation takes place. For film formation it may be spread on mercury, or on polished metal, or on glass, or on a coated surface, for example a polished plate coated with an easy-stripping film of cellulose ester base, which is, however, mutually adherent with the zein film. It may be used in making forms other than films.

Example 5

To 75 parts by weight of a 12% zein solution in a solvent consisting of 70% ethyl alcohol and 30% water, or to any equivalent solution, I may add 10 parts by weight of secondary butyl alcohol as a balancing solvent. As a plasticizer I may add 2 parts by weight of material such as monoricinolein, monolinolein, monomyristin, and monolaurin, the monoglycerides being preferred.

The resulting mixture may be formed into film, filament or coated film as above described, or into other forms.

Example 6

To 75 parts by weight of a 12% zein solution in a solvent consisting of 70% alcohol and 30% water, I may add as a balancing solvent 10 parts by weight of ethylene glycol monethyl ether. As a plasticizer I may add 2 parts by weight of material such as toluene sulphonyl ethylamide, or other sulphonamides from the list:

(a) Toluenesulphonamide
(b) Toluenesulphonylmethylamide
(c) Toluenesulphonyldimethylamide
(d) Toluenesulphonylethylamide
(e) Toluenesulphonyldi-normal-butylamide
(f) Toluenesulphonanilide
(g) Toluenesulphonylmethylanilide
(h) Benzenesulphonamide
(i) Benzylsulphonamide
(j) Benzylsulphonanilide
(k) Benzylsulphonyl-normal-heptylamide
(l) Ethanesulphonamide
(m) Ethanesulphonyl-normal-butylamide In addition I add a protein fixative such as glyoxal, or such as 2.5 parts by weight of a 37% formaldehyde solution. The resulting mixture is formed into films, coats or filaments as above described.

Example 7

To 75 parts by weight of the basic zein solution described in Example 4 with the added 2.5 parts by weight of 37% formaldehyde solution as protein fixing agent, and with the added 10 parts by weight of ethylene glycol monoethyl ether, I may add as plasticizer 2 parts of ester such as glycine ethyl ester. The mixture is treated to manufacture final forms as disclosed elsewhere.

Example 8

To 75 parts by weight of the zein base solution described in Example 4, with the added 2.5 parts by weight of the fixing 37% formaldehyde solution, and with an added 10 parts of ethyl lactate as a balancing solvent, I may add 2 parts by weight of plasticizer, such as ethylene glycol monoethyl ether phthalate.

Example 9

To 75 parts by weight of the zein base solution described in Example 4, with the added 2.5 parts by weight of commercial 37% formaldehyde solution, and with an added 10 parts by weight of ethylene glycol monoethyl ether, I may add as plasticizer 2 parts by weight of material such as ethyl carbamate, but preferably symmetrical diethyl-diphenyl urea.

Example 10

*Preparation of gliadin.*—Wheat flour is mixed with alcohol and water for four hours in the amount of 400 grams of wheat flour to 150 cc. of water and 450 cc. of 95% ethyl alcohol. The suspension is filtered and the filtrate evaporated at reduced pressure to about 25 cc. in volume. Then 25 cc. of ethyl alcohol (95%) is added and evaporation continued until the volume is again about 25 cc. Add 5 cc. of butyl alcohol as a balancing solvent. The resulting solution contains about 10% of gliadin. As a protein fixative, 4 cc. of 37% formaldehyde solution is added. As a plasticizer 0.1 gram of dibutyl tartrate is added. The plasticizers suitable for zein may be substituted.

*Example 11*

*Preparation of hordein.*—Barley is ground and screened through a No. 10 screen to remove the hulls. 280 grams of ground kernels is mixed with 150 cc. water and 450 cc. of 95% ethyl alcohol for four hours. The filtrate is extracted and treated and evaporated as described for gliadin in Example 10. The hordein solution may be brown due to natural coloring matter present. This may be removed by treatment with de-colorizing carbon as described for zein.

The solution may be treated exactly as described in Example 10 for gliadin with the same character of results. It may also be treated as described for zein with similar results, using any of the plasticizers for zein.

Although I have disclosed a large number of plasticizers, it is to be understood that the invention is not limited to the species disclosed. All of those which are described in my application Serial No. 701,863, filed December 11, 1933, and all those of the prior art may be employed. The invention involves the use of a balancing solvent which assures clear films and avoids precipitation of zein in the process of evaporating the volatile solvent. It is not essential that the balancing solvent be a volatile one as hereinabove explained. The preferred ones are as a rule, high-boiling solvents and volatile ones, such characteristic usually rendering the material a slowly evaporating one.

I claim:

1. A liquid coating composition comprising zein and a substantially non-volatile, neutral, organic plasticizer incorporated together with a neutral, organic, mutual solvent having a boiling point higher than 120° C.

2. Method of preparing plastic compositions which comprises incorporating zein with a substantially non-volatile neutral, odorless organic plasticizer in the presence of a neutral, substantially colorless, organic, mutual solvent having a boiling point higher than 120° C.

3. Method of preparing plastic compositions which comprises incorporating zein with a substantially non-volatile, neutral, odorless organic plasticizer in the presence of a mutual solvent comprising aqueous ethylene glycol ether.

4. A liquid composition for the production of a prolamine base solid, comprising together in solution, non-volatile solute predominating in prolamine, and solvent comprising water, a low-boiling volatile alcohol which together with the water provides a solvent for prolamine, and a balancing solvent component having a higher boiling point than the alcohol whereby to retard the rates of evaporation of the volatile ingredients to leave during the evaporation a residual solvent capable of holding the prolamine in solution and upon loss of volatile solvent to form a solid residual gel without precipitation of prolamine.

5. A liquid composition for the production of a prolamine base solid, comprising together in solution, non-volatile solute predominating in prolamine, and containing plasticizer for the prolamine, and solvent comprising water, a low-boiling volatile alcohol which together with the water provides a solvent for prolamine, and a balancing solvent component having a higher boiling point than the alcohol whereby to retard the rates of evaporation of the volatile ingredients to leave during the evaporation a residual solvent capable of holding the prolamine in solution and upon loss of volatile solvent to form a residual gel without precipitation of prolamine.

6. The method of forming a homogeneous prolamine base product in the form of a film or coating having a clear transparent body of prolamine which comprises dissolving non-volatile material predominating in prolamine in a solvent mixture including a volatile aqueous alcoholic solvent having at least 15% water for dissolving the prolamine and a compatible solvent having a higher boiling point than the alcohol employed, the constitution of the solvent mixture being such as to permit evaporation of the solution to form a solid residual gel without precipitation of the prolamine, and evaporating the volatile solvent ingredients at a temperature below the boiling points of the volatile ingredients.

7. The method of forming homogeneous zein base product in the form of a film or coating having a clear transparent body of zein which comprises dissolving non-volatile material predominating in zein in a solvent mixture including a volatile aqueous alcoholic solvent having at least 15% water for dissolving the zein and a compatible solvent having a higher boiling point than the alcohol employed, the constitution of the solvent mixture being such as to permit evaporation of the solution to form a solid residual gel without precipitation of the zein, and evaporating the volatile solvent ingredients at a temperature below the boiling points of the volatile ingredients.

8. A liquid composition comprising solute predominate in prolamine, and a compound solvent comprising water, and a non-aqueous organic volatile solvent material, and including a balancing solvent component having a boiling point higher than the said non-aqueous organic volatile solvent material to provide a residual solvent which maintains the prolamine as a solute homogeneous prolamine mass free from precipitated prolamine upon loss of volatile solvent.

9. A prolamine base composition in the form of a film or coating predominating in prolamine which is initially dissolved in an aqueous alcohol solvent mixture and containing incorporated therein a balancing solvent component which is substantially non-volatile on exposure to evaporation, the composition being the residue from the evaporation of volatile solvent from a solution of the prolamine in said mixed solvents including said balancing solvent component, the latter serving to retard the evaporation of the volatile portion of the mixed solvent and to keep the prolamine in gel form to provide a clear transparent and homogeneous residue of prolamine.

DONALD W. HANSEN.